United States Patent [19]
Chen

[11] Patent Number: 5,198,062
[45] Date of Patent: Mar. 30, 1993

[54] METHOD OF MAKING GOLF CLUB HEAD

[76] Inventor: Archer C. C. Chen, 35 Yichaong e. road, taipin, taichung county, Taiwan

[21] Appl. No.: 908,147

[22] Filed: Jul. 2, 1992

[51] Int. Cl.⁵ .............................................. B32B 31/20
[52] U.S. Cl. ............................... 156/245; 273/167 R; 273/167 F; 273/167 J; 273/168; 273/173
[58] Field of Search ................... 156/245; 273/167 R, 273/167 F, 167 J, 168, 173

[56] References Cited

U.S. PATENT DOCUMENTS

| | | | |
|---|---|---|---|
| 1,299,014 | 7/1917 | O'Hara | 273/167 J |
| 4,812,187 | 3/1989 | Homma | 273/167 J |
| 5,062,638 | 11/1991 | Shira | 273/73 |
| 5,082,278 | 1/1992 | Hsien | 273/167 R |
| 5,100,144 | 3/1992 | Okumoto | 273/167 J |
| 5,141,231 | 8/1992 | Cox | 273/173 |

Primary Examiner—Caleb Weston
Attorney, Agent, or Firm—Browdy and Neimark

[57] ABSTRACT

A method of making a golf club head includes a step of making a slot located at a ball-striking face of a metal head body. The slot is filled with a fiber bulk molding compound preimpregnated in an epoxy resin and is then covered with a prefabricated ball-striking plate. Such head body is placed in a mold cavity of a molding tool, which is subsequently subjected to a treatment under heat and pressure for a predetermined period of time. Upon the completion of the curing of the epoxy resin of the head body, the molding tool is opened to have the club head removed therefrom.

13 Claims, 3 Drawing Sheets

METHOD OF MAKING GOLF CLUB HEAD

BACKGROUND OF THE INVENTION

The present invention relates to a method of making a golf club head.

A stainless steel head of the prior art golf club is generally provided with a greater sweet spot and a better ball-controlling capability by virtue of the fact that its weight is uniformly distributed throughout the head; nevertheless it is defective in that its face is vulnerable to distortion in view of the fact that it has an insufficient rigidity. On the contrary, a carbon fiber head of the prior art golf club is generally provided with an excellent quality of hardness so as to overcome the deficiency described above. However, such lightweight carbon fiber head of golf club has a major shortcoming that it is provided with a weight for the purpose of improving the quality of its heaviness at the expense of its ball-controlling capability. In other words, such carbon fiber head has a relatively small sweet spot.

In order to overcome simultaneously the shortcomings of the stainless steel head of the prior art golf club and the carbon fiber head of the prior art golf club, the striking face of the stainless steel head is provided with a striking plate made from carbon fiber compound. Such mixed head has a large sweet spot and an excellent quality of hardness to resist any distortion of the head.

There are several methods that can be employed to make such mixed head of golf club as described above. For example, a cast head is provided with a slot intended to accommodate a striking plate of carbon fiber material. Such carbon fiber plate is adhered to the slot of the cast head. However, such method is defective in design in that such carbon fiber plate is susceptible to detachment in view of the facts that it is often technically difficult to have a carbon fiber plate adhered securely to a cast head, and that the adhesive, which is used in such method, contains epoxy resin which is highly flowable under pressure and is therefore unable to hold the carbon fiber plate and the cast head together securely. Such deficiency can be overcome by an expensive precision process, which will undoubtedly result in a substantial increase in overall cost of making a golf club.

There is another method, in which a plurality of carbon fiber fabric sheets are stacked in the slot provided on the striking face of a golf club head and are subsequently treated under heat and pressure to form a carbon fiber plate which is attached to the golf club head upon the completion of the treatment. Such carbon fiber plate is of such poor quality as to be vulnerable to stripping piece by piece upon hitting balls.

There is still another method, in which a prefabricated ball-striking plate of dovetail profile is inserted securely into a dovetailed slot of a metal golf club head. The dimension of the dovetailed ball-striking plate of carbon fiber must be very precise in relation to the size of the slot of the metal golf club head, so as to ensure that the ball-striking plate fits well into the slot of the golf club head. In addition, the contact surfaces between the ball-striking plate and the slot must be smooth without any gap so as to ensure that a player swings the golf club comfortably.

Furthermore, a metal golf club head has a uniformly distrubted weight so that the location of its center of gravity is relatively high. With such golf club, a player can hardly hit a ball to travel farther.

SUMMARY OF THE INVENTION

It is, therefore, the primary objective of the present invention to provide a method of making a metal golf club head comprising a striking plate having a hardness greater than that of the metal golf club head.

It is another objective of the present invention to provide a method of making a golf club head having a lower location of center of gravity.

In keeping with the principles of the present invention, the foregoing objectives of the present invention are accomplished by a method of making a golf club head, in which a bulk molding compound of fiber preimpregnated in an epoxy resin is used as an adhesive to attach securely a prefabricated ball-striking plate of a hardness to a ball-striking face of a metal golf club head.

The foregoing objectives, features and functions of the present invention will be better understood by studying the following detailed description of five preferred embodiments of the present invention, in conjunction with the drawings provided herewith.

DETAILED DESCRIPTION OF THE PREFERRED EMBODIMENTS

Figure 1:
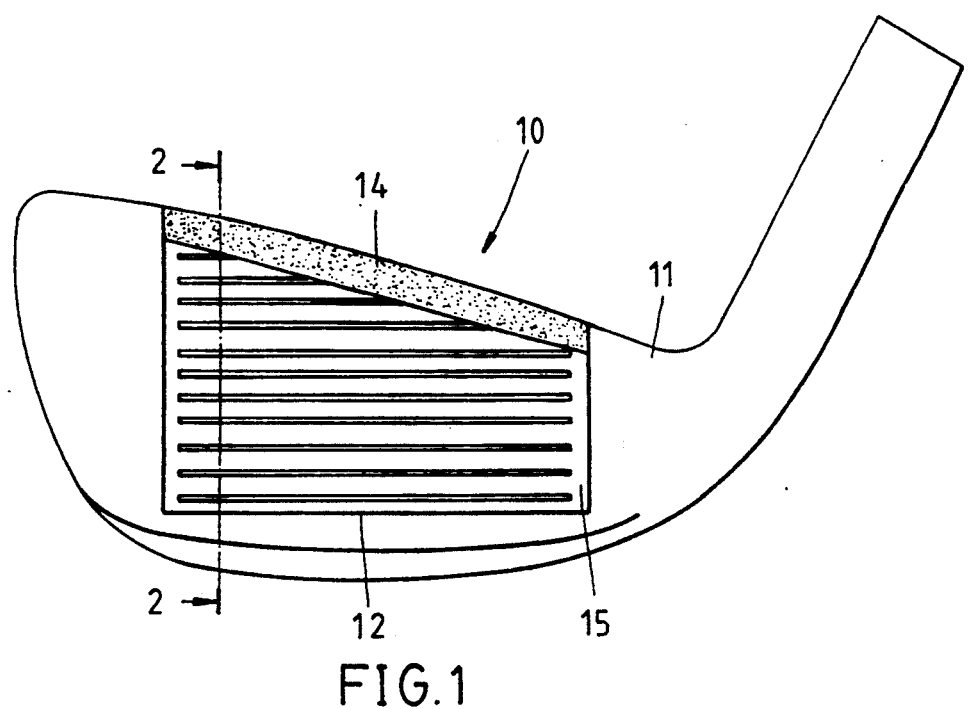
FIG. 1 shows a front view of a golf club head made by a method embodied in the present invention.
Figure 2:
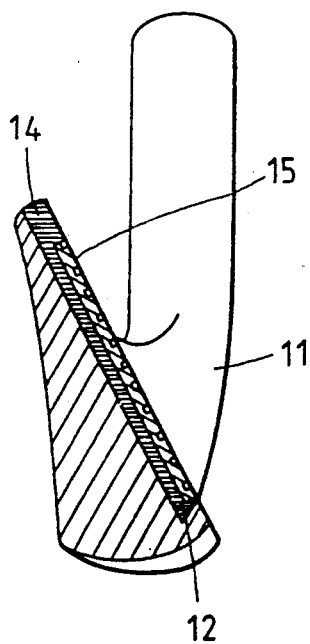
FIG. 2 shows a sectional view of a portion taken along the line 2—2 as shown in FIG. 1.
Figure 3:
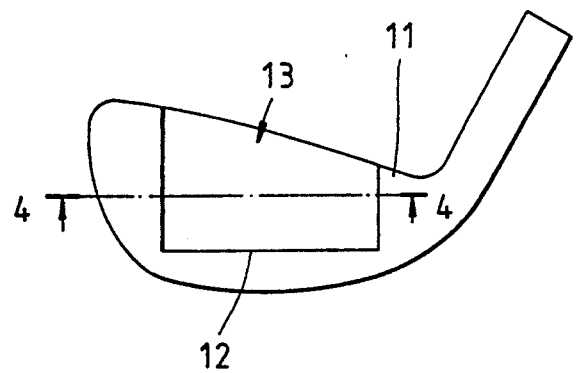
FIG. 3 shows another view of the golf club head as shown in FIG. 1.
Figure 4:
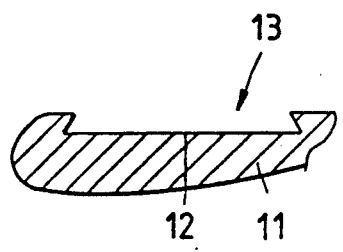
FIG. 4 shows a sectional view of a portion taken along the line 4—4 as shown in FIG. 3.
Figure 6:
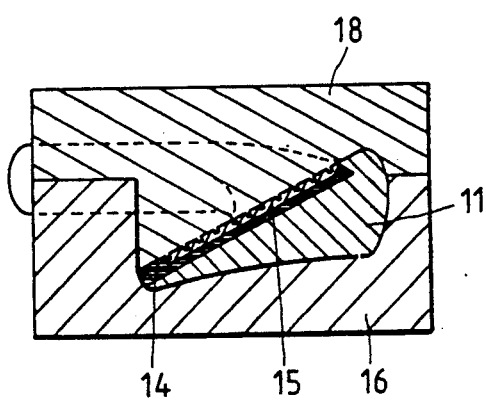
FIG. 6 shows a combination view of the present invention as shown in FIG. 5.
Figure 5:
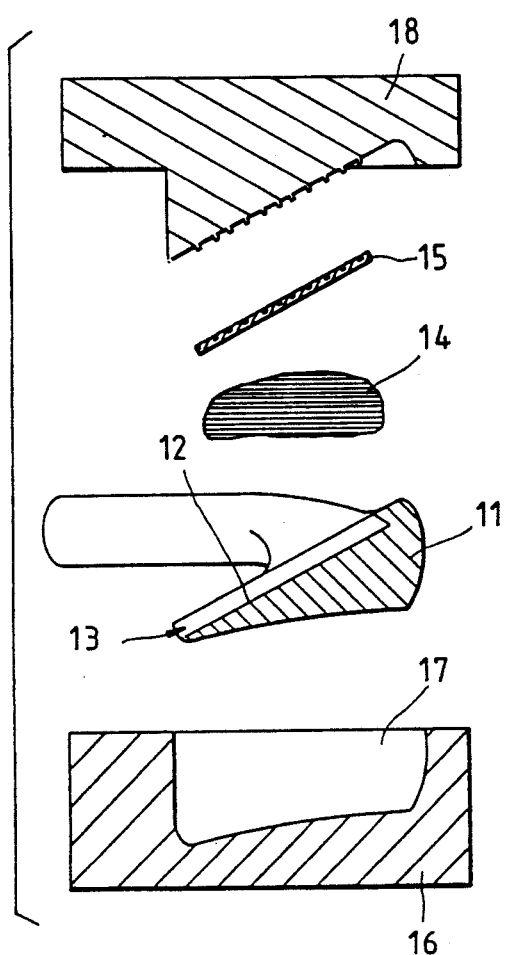
FIG. 5 shows a schematic exploded view of the method of the present invention.

As shown in FIGS. 1 and 2, a golf club head 10 made by a method of the present invention is composed of a metal head body 11 having a slot 12 located in a ball-striking face thereof. As shown in FIGS. 3 and 4, the slot 12 has a cut 13 of wedge profile. A quantity of a bulk molding compound 14 of fiber preimpregnated in an epoxy resin is placed in the slot 12, which is then topped by a ball-striking plate 15. The head body 11 is placed in a mold cavity 17 of a bottom mold 16, which is then covered by a top mold 18 and is then treated under a predetermined pressure and at a predetermined temperature for a predetermined period of time. The head body 11 is removed from the mold at such time when the curing of the epoxy resin has been brought to a completion.

The ball-striking plate 15 may be made from a compound material, or titanium, or a ceramic material. The depth H of the slot 12 is about 2-5 mm, preferably 3-4 mm. The thickness of the ball-striking plate 15 should be between 1.5 mm and 2.5 mm. The bulk molding compound may be made of carbon fiber, or kaveler fiber by DuPont, or glass fiber, which is mixed with an epoxy resin, with an optimum content of fiber being over 30%.

If the ball-striking plate 15 is to be made from a compound material, a method disclosed by this inventor in the Taiwanese Patent bearing the number of 79102926 is suggested. This method produces an excellent ball-striking plate 15.

In operation, the quantity of the bulk molding compound must be greater than the space quantity obtained by subtracting the volume of the ball-striking plate 15 from the volume of receiving space of the slot 12. When the bottom mold 16 and the top mold 18 are pressed to join together, the bulk molding compound 14 is forced to attach securely to the ball-striking plate 15, with some of the bulk molding compound 14 spilling out of the cut 13. Upon the completion of the curing process, the golf club head 10 is removed from the mold. Thereafter, the top portion of the newly-made golf club head 10 is polished.

The advantage of the present invention is that the ball-striking plate 15 is securely adhered to the head body 11 by means of an attachment layer 14 which is made of the bulk molding compound having a density on the order of 1.6 g/cm$^3$ as compared with the density of stainless steel in a range of 7.8-8.0 g/cm$^3$. In addition, the hardness of the attachment layer 14 is greater than that of the stainless steel, thereby resulting in lowering the center of gravity of the head body 11 so as to enhance the ball-striking capability of the golf club.

There is another advantage of the present invention. The bulk molding compound 14 is made to adhere to both the head body 11 and the ball-striking plate 15 under high pressure. Therefore, the bulk molding compound 14 is securely adhered to the attachment surfaces of the head body 11 and the ball-striking plate 15, even if the attachment surfaces of the head body 11 and the ball-striking plate 15 are not smooth. Such binding effect will be even better if both the ball-striking plate 15 and the bulk molding compound 14 are made of a carbon fiber material preimpregnated in an epoxy resin, in view of the fact that both the attachment layer 14 and the ball-striking plate 15 are securely anchored in the slot 12 of the head body 11, thanks to the cut 13 of wedge profile serving as an effective retaining means. Furthermore, the attachment layer 14 is so solid as to be devoid of any void.

There is still another advantage of the present invention. The ball-striking plate 15 may be made of other material such as ceramic material, which is so hard as to be highly resistant to abrasion. In addition, the ball-striking plate 15 may be prefabricated with scoring lines of various shapes to meet the various marketing requirements.

Figure 8:
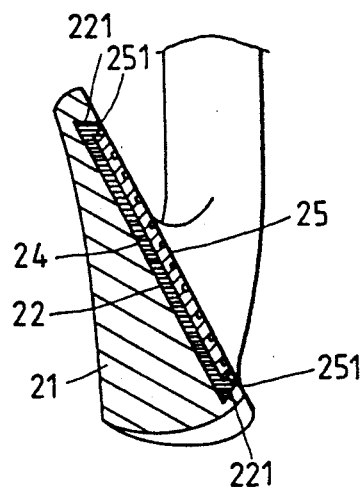
FIG. 8 shows a sectional view of a portion taken along the line 8—8 as shown in FIG. 7.
Figure 7:
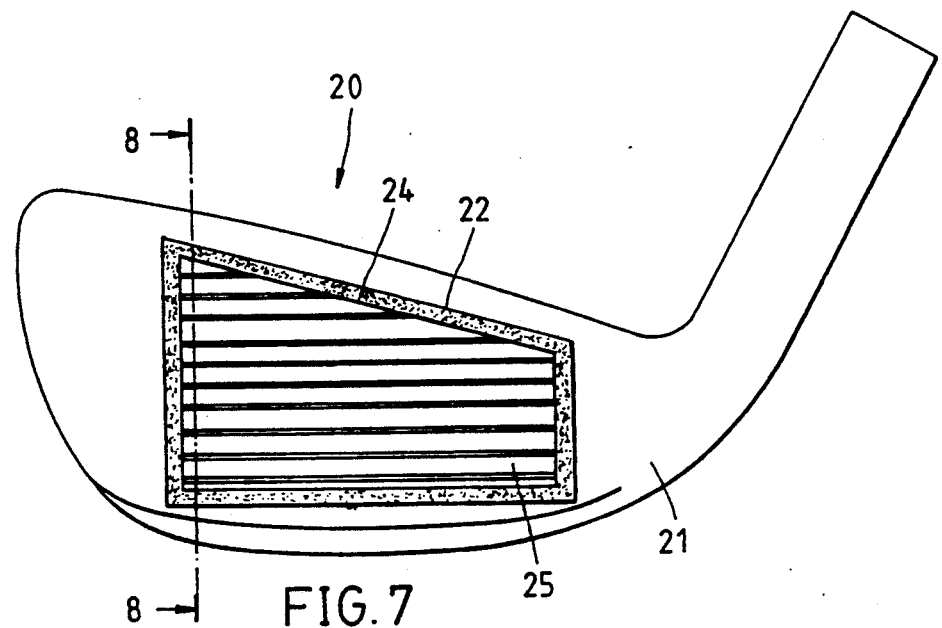
FIG. 7 shows a front view of a golf club head made by a second embodiment of the present invention.

As shown in FIGS. 7 and 8, a second embodiment of making a golf club head 20 of the present invention is illustrated. The method of making the golf club head 20 is similar to that of making the golf club head 10 of the present invention, with the only differences being that the slot 22 of the head body 21 is devoid of a cut, and that the walls of the slot 22 are provided inwardly with inverted angles 221, and further that the side walls of the ball-striking plate 25 are provided with bevels 251 which are located at the positions corresponding to those of the inverted angles 221 and which are of the same shape as the inverted angles 221. The size of the widest inner side of the ball-striking plate 25 is roughly corresponding to the size of the narrowest outer side of the slot 22. As a result, when the ball-striking plate 25 is forced into the slot 22, the bulk molding compound 24 is forced to flow toward the bevel spaces formed by the walls of the slots 22 and the ball-striking plate 25. The quantity of the bulk molding compound 24 used in such method must be precise to an extent that the quantity of the bulk molding compound 24 is permitted to exceed barely the amount sufficient to fill the space between the slot 22 and the ball-striking plate 25. The excessive amount of the bulk molding compound 24 is permitted to spill out of the molding tool under heat and pressure. Upon the completion of the curing process, the golf club head 20 with the ball-striking plate 25 attached thereto is removed from the molding tool. Of course, the ball-striking plate 25 must be polished before being ready for shipment.

Figure 9:
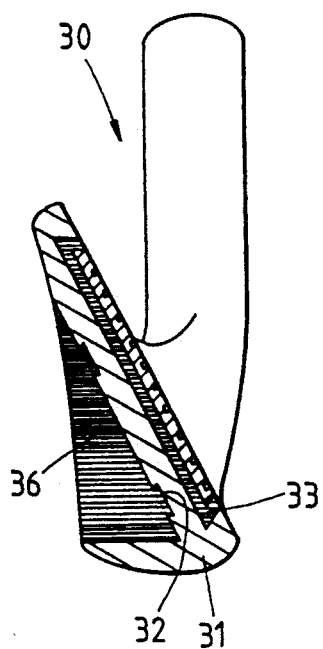
FIG. 9 shows a sectional view of a golf club head made by a third preferred embodiment of the present invention.
Figure 10:
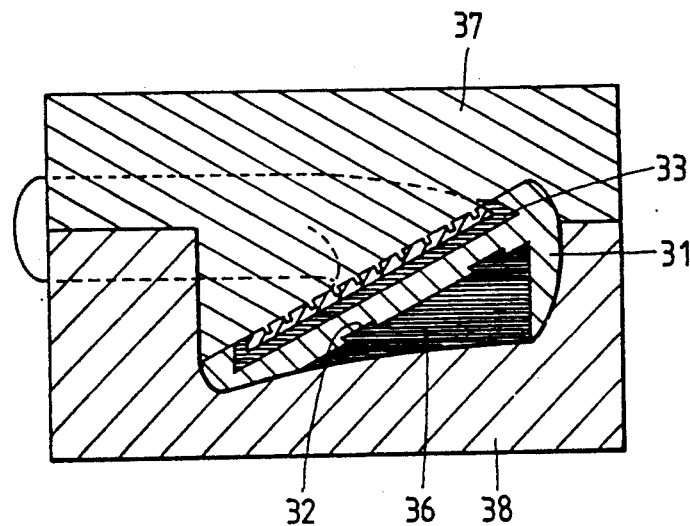
FIG. 10 shows a schematic view of the third preferred embodiment of the present invention.

The third preferred embodiment of the present invention is illustrated in FIGS. 9 and 10, in which a golf club head 30 is provided on its back with a reinforced layer 36 made of a carbon fiber bulk molding compound. In order to ensure that the reinforced layer 36 is securely adhered to a head body 31, a groove 32 of wedge profile (or a rib of wedge profile) is provided on the back of the head body 31. The bulk molding compound is placed in front of the head body 31 and in the rear of the head body 31, before the head body 31 is treated in a top and a bottom molds 37 and 38 under heat and pressure. The golf club head 30 so made is provided with a reinforced structure and a center of gravity whose location is further lowered.

Figure 11:
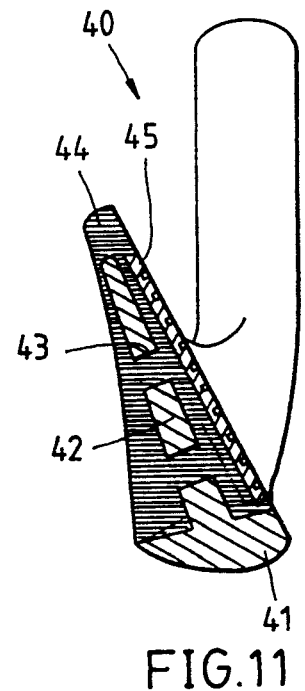
FIG. 11 shows a sectional view of a golf club head made by a fourth preferred embodiment of the present invention.

As shown in FIG. 11, a golf club head 40 made according to the fourth preferred embodiment of the present invention has a metal head body 41 of an inverted T shape in its cross section. The head body 41 has a body portion 42 provided with a through hole 43. The body portion 42 is covered entirely by a bulk molding compound 44 which also fills the entire through hole 43, before being subjected to a treatment in a molding tool under heat and pressure. In making such golf club head, the bulk molding compound 44 is prearranged in the molding tool or in front of the body portion 42. The ball-striking plate 45 is oriented appropriately by means of its scoring lines engaging with the ribs prearranged in the top mold. Under pressure, the bulk molding compound 44 flows through the through hole 43 to fill the entire mold cavity of the molding tool.

Figure 12:
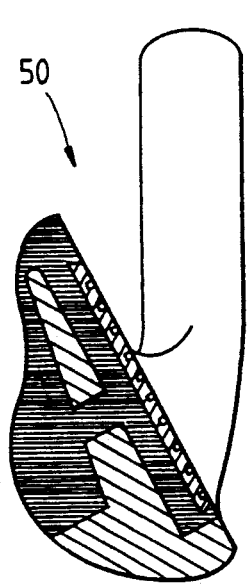
FIG. 12 shows a sectional view of a golf club head made by a fifth preferred embodiment of the present invention.

The fifth embodiment of the present invention is shown in FIG. 12, in which a golf club head 50 is attached to an iron golf club having a lower center of gravity. Such golf club head can reduce the torsional movement upon hitting a ball. With such golf club head, a player has a better chance of hitting a ball to go higher and farther.

What is claimed is:

1. A method of making golf club head comprising steps of:
   (a) making a metal head body having a neck portion intended to fasten thereto said golf club;
   (b) prefabricating a ball-striking plate of a hardness, with said ball-striking plate having scoring lines disposed on a face thereof;

(c) placing said head body in a molding tool;

(d) placing a fiber bulk molding compound, which is preimpregnated in an epoxy resin, in a predetermined location of said head body inside said molding tool;

(e) placing said ball-striking plate on said fiber bulk molding compound in such a manner that it is positioned at a ball-striking face of said golf club head;

(f) closing said molding tool, which is subsequently subjected to a pressure so as to make said fiber bulk molding compound to fill in a space between said head body and said ball-striking plate to form an attachment layer, with said ball-striking plate embedded in said attachment layer in such a manner that it is located at the position of said ball-striking face of said golf club head, and with said face having scoring lines of said ball-striking plate attached directly to a wall of a mold cavity of said molding tool without being covered by said attachment layer; and (g) heating said molding tool to reach a predetermined temperature for a predetermined period of time so as to cause said fiber bulk molding compound to cure, and subsequently removing said golf club head from said molding tool.

2. The method of making golf club head of claim 1 wherein said metal head body has a shape similar to that of said golf club head and has a slot located at a position corresponding to said ball-striking face and provided with a wall of such construction as to make said slot to have a wedge profile; wherein said fiber bulk molding compound is placed in said slot; wherein said ball-striking plate has a size smaller than that of a top portion of said slot and is embedded in said slot in such a manner that it is kept in line with a top surface of said metal head body.

3. The method of making golf club head of claim 2 wherein said slot has a cut to be filled with said fiber bulk molding compound upon completion of making said golf club head.

4. The method of claim 1 wherein said ball-striking plate has a bevel wall and a wider face which is embedded in said attachment layer.

5. The method of claim 1 wherein said head body has a back having a slot, which is filled with said fiber bulk molding compound preimpregnated in said epoxy resin, so as to form a reinforced layer integrally with said attachment layer.

6. The method of claim 5 wherein said back of said head body is provided with a slot of wedge porfile or a rib of wedge porfile.

7. The method of claim 1 wherein said head body has an inverted T shape in its cross section; wherein said head body has a body portion having at least a through hole; wherein said fiber bulk molding compound covers entirely said body portion and fills in said through hole.

8. The method of claim 1 wherein said ball-striking plate is made from a compound material, or titanium, or a ceramic material.

9. The method of claim 4 wherein said ball-striking plate may be made from a compound material, or titanium, or a ceramic material.

10. The method of claim 5 wherein said ball-striking plate may be made from a compound material, or titanium, or a ceramic material.

11. The method of claim 2 wherein said slot has a depth of 2-5 mm, with an optimum depth ranging from 3 mm to 4 mm; wherein said ball-striking plate has a thickness in a range between 1.5 mm and 2.5 mm.

12. The method of claim 1 wherein said bulk molding compound may contain carbon fiber mixed with an epoxy resin, or Kaveler fiber mixed with an epoxy resin, or glass fiber mixed with an epoxy resin.

13. The method of claim 12 wherin the content of said fiber is preferably over 30%.

* * * * *